(12) United States Patent  
Meron et al.

(10) Patent No.: US 6,597,991 B1  
(45) Date of Patent: Jul. 22, 2003

(54) SYSTEM AND METHOD FOR REMOTE MONITORING OF WATER STRESS STATUS OF GROWING CROPS

(75) Inventors: Moshe Meron, Kibbutz Shamir (IL); Joseph B. Tsipris, Kiryat Shmona (IL)

(73) Assignee: Agrosense Ltd., Kiryat Shmona (IL)

( * ) Notice: Subject to any disclaimer, the term of this patent is extended or adjusted under 35 U.S.C. 154(b) by 131 days.

(21) Appl. No.: 09/819,327

(22) Filed: Mar. 28, 2001

(51) Int. Cl.⁷ .............................................. G01W 1/00
(52) U.S. Cl. ................................. 702/3; 382/110
(58) Field of Search .................. 702/3; 703/3; 700/284; 348/144; 382/110

(56) References Cited

U.S. PATENT DOCUMENTS

| | | | |
|---|---|---|---|
| 4,638,594 A | 1/1987 | Huguet et al. | 41/1 R |
| 4,755,942 A | 7/1988 | Gardner et al. | 364/420 |
| 4,876,647 A | 10/1989 | Gardner et al. | 364/420 |
| 4,998,826 A | 3/1991 | Wood et al. | 374/129 |
| 5,539,637 A | 7/1996 | Upchurch et al. | 364/420 |
| 5,710,047 A | 1/1998 | Murray | 436/94 |
| 5,764,819 A * | 6/1998 | Orr et al. | 348/144 |
| 5,839,660 A | 11/1998 | Morgenstern et al. | 239/63 |
| 5,878,356 A | 3/1999 | Garrot, Jr. et al. | 701/1 |
| 5,884,224 A | 3/1999 | McNabb et al. | 702/2 |
| 6,178,253 B1 | 1/2001 | Hendrickson et al. | 382/110 |

FOREIGN PATENT DOCUMENTS

WO    WO 99/27768 A1    12/1998

OTHER PUBLICATIONS

M. Susan Moran; "Thermal Infrared Measurement as an Indicator of Plant Ecosystem Health", USDA–ARS Southwest Watershed Research Center, Tucson, Arizona, Jun. 2000 [Moran@Tucson.ars.ag.gov, Tel. 520–670–6380 ext. 171].

Wanjura and Upchruch; "Canopy Temperature Characterization of Corn and Cotton Water Status," Transactions of the American Society of Agricultural Engineers, vol. 43, Issue 4, pp. 867–875, St. Joseph, Michigan, 2000.

* cited by examiner

*Primary Examiner*—Edward Lefkowitz  
*Assistant Examiner*—Anthony Gutierrez  
(74) *Attorney, Agent, or Firm*—James W. Kayden; Thomas, Kayden, Horstemeyer & Risley (57) ABSTRACT

A method and system for evaluating the water stress status of growing crops in nearly real time employing remote monitoring of entire crop-growing areas, rather than sampling or spot checks, at sufficiently high resolution to recognize features in the crop-growing area, especially to distinguish between crop foliage and non-foliage features, and requiring minimal additional measurements of environmental parameters in the crop-growing area.

53 Claims, 4 Drawing Sheets

SYSTEM AND METHOD FOR REMOTE MONITORING OF WATER STRESS STATUS OF GROWING CROPS

FIELD OF THE INVENTION

The present invention relates generally to sensing of irrigation status in crops.

BACKGROUND OF THE INVENTION

Water stress is known to be a major factor affecting crop yield. Further, it has long been known that crop canopy temperature is a good indicator of water stress in plants. For example, U.S. Pat. No. 4,998,826 to Wood et al., which discloses an "Agricultural Infrared Thermometer," teaches (col. 1, lines 16–19) that "there is a narrow foliage temperature range, or a thermal kinetic window, within which the plant will achieve optimum yield and biomass production."

A detailed overview of the state of the art in the use of thermal infrared measurements for monitoring and measuring plant health may be found in "Thermal Infrared Measurement as an Indicator of Plant Ecosystem Health" (520-670-6380 X 171, June 2000) by M. Susan Moran, published by USDA-ARS Southwest Watershed Research Center, Tucson, Ariz.

It is also known that the difference in temperature between well-watered and inadequately watered or stressed crop canopies depends on additional environmental factors such as total incident radiation, air temperature, relative humidity, and wind speed. In their article, "Canopy Temperature Characterization of Corn and Cotton Water Status," Transactions of the ASAE, 43(4), 867, the contents of which are incorporated herein by reference, Wanjura and Upchurch review the progression of different measures of crop water stress and how they are determined or calculated and conclude that the crop water stress index (CWSI) is a superior measure of water stress, but that both theoretical and empirical forms of the CWSI (CWSI-T and CWSI-TC, respectively) require measurement or calculation of multiple environmental factors that make their application difficult and impractical.

U.S. Pat. Nos. 4,755,942 and 4,876,647 to Gardner et al. disclose portable apparatus to determine crop water stress by simultaneously measuring a number of environmental and plant physiological parameters including air temperature, relative humidity, and plant canopy temperature. However, measurements with the apparatus disclosed therein have the limitations of variations in the environmental parameters over time and across the extent of typical crop-growing areas and variations in plant canopy temperature measurements as a result of differences in the position and orientation of a hand-held sensor. As a result, the determination of crop water stress with the disclosed system is of limited reliability. Further, given the size and non-uniformity of typical crop-growing areas, measurements with the hand-held apparatus disclosed therein are totally impractical except for spot-checking, as opposed to systematic monitoring of plant water stress desired in commercial agriculture.

Another approach is that of Murray in U.S. Pat. No. 5,710,047, "Method for Monitoring Growth and Detection of Environmental Stress in Plants," which relies on laboratory analysis of sample plant tissues. The method disclosed therein, while accurate, is also impractical for the systematic monitoring desired in commercial agriculture, especially if it is desired to control irrigation of crop-growing areas in a timely manner.

SUMMARY OF THE INVENTION

The present invention seeks to provide a method and system for evaluating the water stress status of growing crops in nearly real time employing remote monitoring of entire crop-growing areas, rather than sampling or spot checks, at sufficiently high resolution to recognize features in the crop-growing area, especially to distinguish between crop foliage and non-foliage features, and requiring minimal additional measurements of environmental parameters in the crop-growing area.

There is thus provided, in accordance with a preferred embodiment of the invention, a system for evaluating the water stress status of growing crops including:

a reference array near or within a selected crop-growing area for performing reference parameter measurements thereon;

one or more sensors, which may be portable, for measuring environmental parameters, such as global radiation, air temperature, relative humidity, and wind speed, in the vicinity of the crop-growing area and of the reference array;

a portable imaging sensor for measuring a preselected physical parameter, preferably surface temperature, on a pixel by pixel basis over a selected area, thereby producing a two-dimensional array of pixels corresponding to a thermal image of the crop-growing area and of the reference array;

a portable location sensor for detecting global location reference signals;

a mobile platform, preferably airborne, for supporting all the portable sensors, which maintains a predetermined altitude during measurement by the portable imaging sensor so that the thermal image of the crop-growing area and of the reference array is made up of measurement pixels of a predetermined size, preferably providing a measurement of the surface temperature of an area smaller than a meter squared;

data processing apparatus, which may also include one or more data storage devices, arranged in data receptive association with each other and with the sensors for receiving parameter measurements therefrom; and a multiplicity of communications devices for transmitting the parameter measurements from the sensors and data storage devices to the data processing apparatus;

wherein the reference array allows measurement of reference parameters which, together with crop parameter measurements of growing crops, facilitates the data processing apparatus in determining the water stress status of the growing crops.

Additionally in accordance with a preferred embodiment of the invention, there is provided for use with the system for evaluating the water stress status of growing crops, a reference array near or within a selected crop-growing area for performing reference parameter measurements thereon, which includes a plurality of component reference surfaces, typically formed of fabric, in a predetermined arrangement, each of the component reference surfaces being a predetermined size and having predetermined radiometric and heat-convection properties; and wherein the component reference surfaces allow measurement of a plurality of reference parameters which, together with crop parameter measurements of growing crops, facilitates determination of the water stress status of the growing crops. The component reference surfaces include one or more first reference surfaces fabricated to produce preselected parameter measurements substantially equivalent to those taken on a potentially transpiring crop surface that is internally saturated and one or more second reference surfaces, which are substantially dry, shielded from thermal radiation coming from therebelow, and fabricated to have predetermined heat-convection properties. Accordingly, the first reference surface is configured to permit substantially free evaporation therefrom and includes wetting apparatus which continuously wets ARS 15 first reference surface with water during preselected time intervals including when measurements are to be taken. Further in accordance with a preferred embodiment of the invention, there are two or more second reference surfaces, which are substantially dry and which include one or more uniformly light-colored surfaces and one or more uniformly dark-colored surfaces.

In accordance with an alternative embodiment of the invention, the reference array may further include one or more environmental sensors for measuring predetermined environmental parameters at its location. Additionally in accordance with an alternative embodiment of the invention, the reference array may also include temperature sensors for measuring the surface temperatures of the component reference surfaces of the reference array. The reference array may also include a clock device for producing time reference signals and wireless transmission apparatus for transmitting reference parameter measurements and time reference signals to the system so that the system can synchronize the reference parameter measurements with crop parameter measurements for determination of the water stress status of the growing crops. Alternatively, the reference array may further include a data storage device for storing all measurements until they are transmitted by the wireless transmission apparatus to the system for processing.

In accordance with a preferred embodiment of the invention, the size of the component reference surfaces of the reference array allows them to correspond to a predetermined number of whole pixels, preferably, at least four, in the thermal image of the crop growing area and of the reference array produced by the portable imaging sensor when performing measurements at the predetermined altitude above of the crop growing area and of the reference array.

In accordance with yet a further preferred embodiment of the invention, there is provided a method for evaluating the water stress status of growing crops employing the system and the reference array described hereinabove. The method includes the steps of:

providing, near a selected crop-growing area, a reference array, with a number of component reference surfaces, for reference parameter measurements;

measuring, in the vicinity of the crops and in the vicinity of the reference array, a plurality of measurements of a predetermined set of environmental parameters, such as global radiation, air temperature, relative humidity, and wind speed;

measuring, for the crops and for the reference array, a plurality of measurements of a predetermined set of physical parameters, preferably of the surface temperature, wherein each measurement includes a physical parameter measurement and the location at which the physical parameter was measured;

identifying, by means of the location measurement associated with each physical parameter measurement, those measurements of physical parameters pertaining to the component reference surfaces of the reference array, and those measurements of physical parameters pertaining to the crop-growing area; and employing the measured parameters for the crop-growing area and those for the reference array for evaluating the water stress status of the crops growing in the crop-growing area.

The step of providing a reference array, includes providing wet component reference surfaces and wetting them with water continuously during preselected time intervals including intervals when measurements are to be taken, and providing dry component reference surfaces, as described hereinabove.

Additionally in accordance with a preferred embodiment of the invention, the step of measuring a plurality of measurements of the surface temperature includes the step of imaging the crop-growing area and the reference array from a predetermined altitude, preferably from an airborne platform, with a thermal imaging radiometer thereby producing a two-dimensional array of pixels corresponding to a thermal image of the crop-growing area and the reference array wherein each pixel of the thermal image provides a measurement of the surface temperature of an area of a preselected size, preferably smaller than a meter squared, of the crop-growing area. The step of imaging may include the substeps of:

producing a number of partial images of the crop-growing area;

locating, to a preselected precision, each of the partial images of the crop-growing area, preferably by measuring a global location reference signal for each partial image; and splicing the partial images of the crop-growing area to produce a two-dimensional array of pixels corresponding to a thermal image of the entire crop-growing area and of the reference array.

Further, in accordance with a preferred embodiment of the invention, the component surfaces of the reference array will each correspond to a predetermined number of pixels, preferably at least four, in the thermal image produced in the step of imaging.

Additionally in accordance with a preferred embodiment of the invention, the step of identifying further includes the step of distinguishing the pixels in the thermal image of the crop-growing area corresponding to locations covered with crop foliage from the pixels in the thermal image of the crop-growing area corresponding to locations not covered with crop foliage.

In accordance with a preferred embodiment of the invention, the step of employing the measured parameters includes the steps of:

performing statistical analysis of the pixel measurements for a predetermined subset of the pixels in the thermal image of the crop-growing area corresponding to areas covered with crop foliage, thereby determining an effective crop canopy temperature $T_c$;

determining, from the pixel measurements corresponding to all the component reference surfaces of the reference array and from the measurements of the environmental parameters, preferably from the measurements of the global radiation, in the vicinity of the reference array, the theoretical maximum and minimum crop canopy temperatures, $T_{max}$, and $T_{min}$, respectively;

calculating the crop water stress index (CWSI) for the crop-growing area using the formula:

$$\{CWSI\}=(T_c-T_{min})/(T_{max}-T_{min});$$

and evaluating the water stress status of the growing crops from the crop water stress index for the crop-growing area.

In accordance with an alternative embodiment of the invention, the step of determining is performed from the pixel measurements corresponding to the first, or wet, component reference surface of the reference array and from the measurements of the air temperature in the vicinity of the reference array.

In accordance with still another alternative embodiment of the invention, the step of measuring a plurality of measurements of a predetermined set of physical parameters further includes the steps of:

measuring a global location reference signal for the reference array;

measuring a plurality of measurements of the surface temperature for all the component reference surfaces of the reference array by means of surface temperature sensors associated with the reference array, as described hereinabove; and synchronizing, by means of the clock and the wireless transmission apparatus associated with the reference array, as described hereinabove, the measurements of the surface temperature for all the component reference surfaces of the reference array with the plurality of measurements of the surface temperature for the crops.

Thus, in accordance with a preferred embodiment of the invention, the step of determining is performed from the synchronized temperature measurements corresponding to all the component reference surfaces of the reference array measured by the sensors associated therewith and from the measurements of the global radiation in the vicinity of the reference array. In accordance with an alternative embodiment of the invention, the step of determining is performed from the synchronized temperature measurements corresponding to the first, wet, reference surface of the reference array measured by the sensors associated therewith and from the measurements of the air temperature in the vicinity of the reference array.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figure 1:
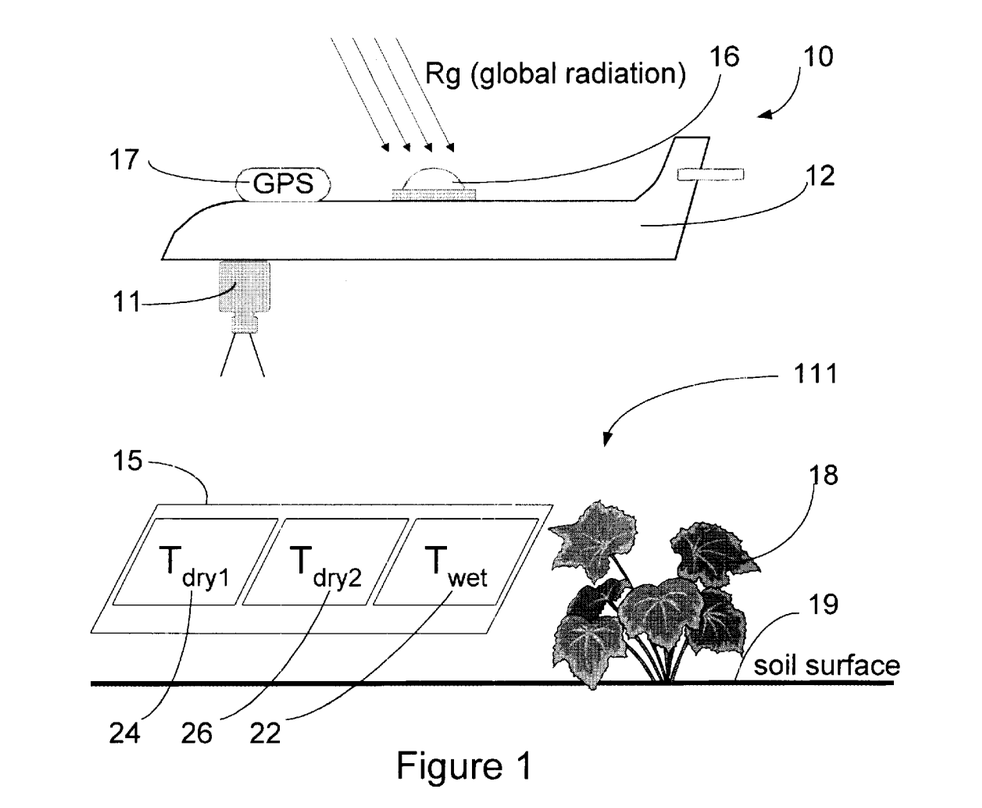
FIG. 1 is a schematic representation of a system for evaluating the water stress status of growing crops constructed and operative in accordance with a preferred embodiment of the present invention.

Referring now to FIG. 1, there is shown a schematic representation of a system, referred to generally as 10, for implementing the method of a preferred embodiment of the present invention for evaluating the water stress status of growing crops, constructed and operative in accordance with a preferred embodiment of the present invention. System 10 includes an imaging sensor 11, which, in the present embodiment, measures the surface temperature of a field, indicated generally by 111, wherein crops 18, for which it is desired to evaluate the water stress status, are growing. Specifically, the crop water stress index (CWSI) may be calculated from surface temperature measurements performed on growing crops, together with measurement of environmental parameters in their vicinity, as taught in the Wanjura and Upchurch article and in U.S. Pat. No. 4,755,942 and U.S. Pat. No. 4,876,647 to Gardner et al., included herein by reference. Measured environmental parameters typically include air temperature, global radiation, relative humidity, and wind speed. System 10 further includes an artificial reference surface (ARS) 15, located in the vicinity of the crop-growing field 111, which, in the present embodiment, includes a number of component reference surfaces, as described below in conjunction with FIG. 2.

Figure 2:
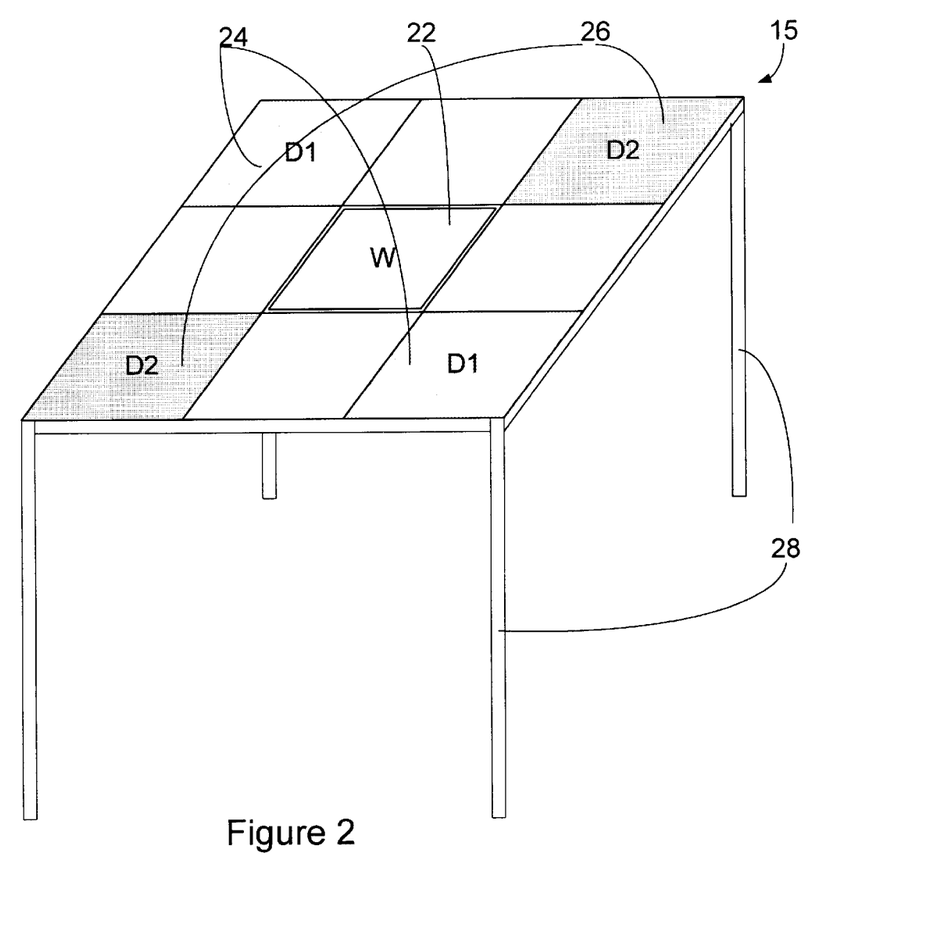
FIG. 2 is a perspective view of an artificial reference array for use with a system for evaluating the water stress status of growing crops, constructed and operative in accordance with a preferred embodiment of the present invention.
Figure 4:
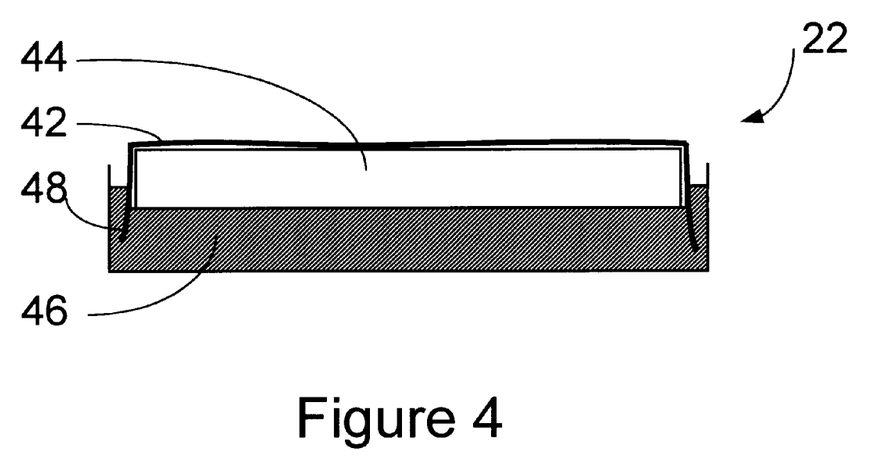
FIG. 4 is a side view of a wet component reference surface of the artificial reference array of FIG. 2.

Referring now to FIG. 2, there is shown a perspective view of an artificial reference array (ARS), referred to generally as 15, constructed and operative in accordance with a preferred embodiment of the present invention. ARS 15, which is located in the vicinity of the crop-growing field, typically includes supports 28 so that the reference surface will be at a height allowing it to be freely ventilated and exposed to the sun from above and, in any case, at least as high as the crop canopy level. In the present embodiment, ARS 15 has an arrangement of component reference surfaces including one wet reference surface 22, two light-colored dry reference surfaces 24, and two dark-colored dry reference surfaces 26. Each of the component reference surfaces may be approximately square with a side typically between a half meter and one meter, though the minimum size is determined in practice by the size of the pixels produced by imaging sensor 11 (FIG. 1), as will be explained below. In the present embodiment, the component reference surfaces are also arranged in a square array, as shown in FIG. 2. It should be noted that all the details of the arrangement and the geometry of the component reference surfaces are strictly by way of example, and that any suitable arrangement and combination of component reference surfaces is included in the present invention. The component reference surfaces of ARS 15 are typically formed of fabric, for example, dyed polyester, but any material whose composition and surface has the desired heat convection and radiometric properties may be used. Specifically, a short response time to changes in temperature is desirable, since live crop foliage responds quickly to temperature changes. The fabric used for wet reference surface 22 must be water absorbent. Additionally, a larger temperature difference between light-colored dry reference surface 24 and dark-colored dry reference surface 26, upon exposure to sunlight, is desirable as it provides a more accurate determination of CWSI. The surface material must also be stable against extended continuous exposure to sunlight and to atmospheric conditions. Dry component reference surfaces 24 and 26 preferably are shielded from thermal radiation coming from therebelow. Wet component reference surface 22 may be wetted, for example, by a wick method, as shown in FIG. 4, wherein surface material 42, which is water absorbent, is mounted on a floating support 44 in a water bath 46 with a portion of its edges 48 extending beyond the edges of the support, and thus immersed in the water. Wetting the surface may be continuous or may be coordinated to provide a suitably saturated surface only when measurements are to be taken.

Returning now to FIG. 1, imaging sensor 11 is flown over field 111 in association with which ARS 15 is suitably positioned, via airborne platform 12, so that a scanned image can be produced of an area including the field with ARS 15.

According to a preferred embodiment of the present invention, imaging sensor 11 is a thermal imaging radiometer which produces an image consisting of pixels wherein each pixel provides a surface temperature measurement for the area covered by the pixel. Airborne platform 12 also preferably carries a global location sensor 17, such as for the GPS system currently in widespread use, though any positioning system with sufficient accuracy and resolution may be used, so the images produced by imaging sensor 11, and indeed the individual pixels making up the images, can be associated with specific and identifiable sections of field 111. Further, for the case wherein a single scan or image does not cover the entire area over which it is desired to take measurements, a number of scans can be spliced, using the position information derived from the GPS signals, to produce a single image of the entire required area, preferably including ARS 15. Typically, the image will further include sections covered by foliage of growing crops 18 and other features, such as bare soil surface 19, access paths and roads, ponds, and buildings. In accordance with an embodiment of the invention, pixels corresponding entirely to measurements on foliage of crop canopy 18 and to component surfaces 22, 24, and 26 of ARS 15 are selected for further analysis, while the other pixel measurements are discarded. This selection may be performed according to a preselected range of temperatures, wherein pixel temperatures too high, as would be the case for bare soil surface or a building, or too low, as for bodies of water, are discarded; or by selecting desired areas from actual images, wherein the locations in the thermal images are determined from the GPS measurements and via image analysis. Alternatively, both methods may be advantageously used in combination.

Airborne platform 12 also carries one or more sensors for environmental parameters, which are also needed for the calculation of the crop water stress index (CWSI) from the surface temperature measurements. In accordance with the present embodiment of the invention, sensor 16 is a pyranometer used for measuring global radiation. In an alternative embodiment of the present invention, global radiation sensors may be located on the ground in a number of locations in the crop-growing area and near ARS 15, together with suitable wireless transmission devices for sending measurements to airborne platform 12 or to a central station, for processing via suitable data processing apparatus or computer. In a further alternative embodiment of the present invention, ARS 15 may have surface temperature sensors associated therewith and mounted so that ARS component surface temperatures may be measured directly and transmitted to airborne platform 12 via the aforementioned wireless transmission devices. Data logging devices associated with the various sensors of system 10 may also be used for collecting measurements with their associated time and location stamps for storage and block transmission. If data processing is performed at a central station, airborne platform 12 will have its own wireless transmission devices and, preferably, data logging devices.

Airborne platform 12 must maintain a uniform flight altitude over the crop-growing area in order to ensure a substantially constant pixel size in the images produced by imaging sensor 11. The flight altitude required is based on the focal length of imaging sensor 11, the pixel sensor size in the focal plane array thereof, and the desired pixel size for the images produced thereby. The criterion determining the desired pixel size is that they be small enough to resolve features in the crop growing-area. In particular, it must be possible to distinguish among cooler foliage, warmer foliage, and non-foliage features, which may also be characteristically hot or cold, in the crop growing-area, such as patches of bare soil (hot) and water puddles (cold). Pixels must correspond to an area less than a metered squared, and they will preferably be smaller, depending on the type of foliage growing. For field crops, the side of the area covered by a single pixel is preferably in the range of 0.1–0.25 meters, while for mature orchard crops, up to 0.5 meters may be adequate. Producing images with pixels corresponding to such small areas requires a relatively low flight altitude, typical of that used for agricultural operations such as crop dusting, of 60–100 meters; though suitable selection of scanners and optics may allow operation at up to 150 meters. In the PRIOR ART, images produced from satellite borne imaging scanners have been used, but the resulting pixel size was much too large, significantly larger than a square meter, to resolve ground details, and the data produced thereby was of limited value. In the present invention, the size of the component surfaces of ARS 15 are also determined by the pixel size in the images produced by imaging sensor 11. Preferably, the pixel size/component surface size combination will produce scans having no less than four whole pixels corresponding to each component surface of ARS 15.

Figure 3:
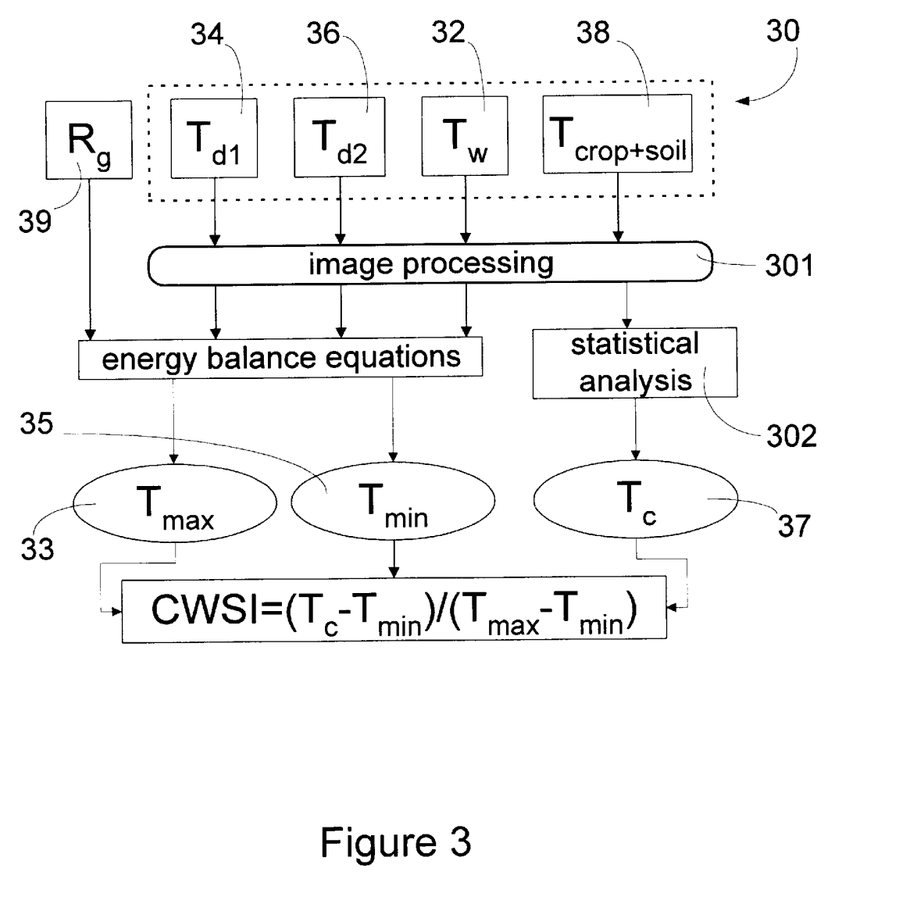
FIG. 3 is a diagrammatic representation of a method for evaluating the water stress status of growing crops using the system of FIG. 1 in accordance with a preferred embodiment of the present invention.

Referring now to FIG. 3, there is shown a diagrammatic representation of a method, referred to generally as 30, for evaluating the water stress status of growing crops using the system 10 of FIG. 1 in accordance with a preferred embodiment of the present invention. Surface temperature measurements are taken of the crop-growing area 38, and for the component surfaces of ARS 15 (FIG. 1). These include temperature measurements for wet reference surface 32 and two dry reference surfaces 34 and 36, which are light and dark colored respectively. Additionally, the global radiation, $R_g$, 39 is measured at the time of the temperature measurements. Using known image processing techniques 301, the pixels corresponding to the desired areas, namely those pixels covering just growing crops and those totally covering component surfaces of ARS are selected. By performing statistical analysis 302 on all the crop pixel temperature measurements 38, an effective crop canopy temperature $T_c$ 37 can be calculated. Using known energy balance equations, the temperature measurements for the component reference surfaces of ARS, which the inventors have confirmed empirically can be used, together with the global radiation $R_g$, to calculate the theoretical maximum and minimum crop canopy temperatures $T_{max}$ 33 and $T_{min}$ 35 without needing to measure other environmental parameters. The minimum crop canopy temperature $T_{min}$ 35 is equivalent to the temperature of a potentially transpiring surface of crops that are well watered, and hence, internally saturated; it is based on the measurements of the surface temperature of wet component reference surface 32 and on the energy balance equations. The maximum crop canopy temperature $T_{max}$ 33 is equivalent to the limiting temperature for a maximally water-stressed crop surface; it is based on the measurements of the surface temperatures of the two dry component reference surfaces 34 and 36 and on the energy balance equations. The use of two dry component reference surfaces of different colors and, hence, different albedo values, allows $T_{max}$ 33 to be calculated without measuring wind speed and relative humidity in the vicinity of the crop-growing area. These representative temperature values allow calculation of the CWSI for the crop-growing area via the equation:

$$\{CWSI\} = (T_c - T_{min})/(T_{max} - T_{min}).$$

Additionally in accordance with an alternative preferred embodiment of the present invention, an ARS consisting only of one or more wet component reference surfaces and air temperature sensors in the vicinity thereof may be employed. In the present alternative embodiment, the minimum crop canopy temperature $T_{min}$ is calculated from the surface temperature measurements of the wet component reference surfaces and the air temperature, and the maximum crop canopy temperature $T_{max}$ is set as the air temperature plus five degrees Centigrade (5° C.), based on empirical considerations determined by the inventors. These values of $T_{max}$ and $T_{min}$, together with the effective crop canopy temperature $T_c$, may then be used in the above equation to calculate CWSI for the crop-growing area.

Using the values of the crop water stress index (CWSI) determined by application of the present invention, which can be calculated on a near real-time basis using remote measurements, irrigation scheduling and water amounts for given crop-growing areas can be determined in timely fashion, thereby achieving optimum yield with maximum efficiency of water use. In a further application of the present invention, if CWSI is calculated locally, as opposed to the above-mentioned global calculation; that is, for individual pixel values or small groups thereof of the crop canopy temperature measurements in place of $T_c$; the present invention may also be used for diagnosing or troubleshooting a crop irrigation system by identifying specific locations where the crops exhibit water stress.

It will further be appreciated by persons skilled in the art that the scope of the present invention is not limited by what has been specifically shown and described hereinabove, merely by way of example. Rather, the scope of the present invention is defined solely by the claims, which follow.

What is claimed is:

1. A method for evaluating the water stress status of growing crops, including the steps of:

providing, at a preselected location within a predetermined proximity to a selected crop-growing area, a reference array for reference parameter measurements;

measuring, in the vicinity of the crops and in the vicinity of the reference array, a plurality of measurements of a predetermined set of environmental parameters;

measuring, for the crops and for the reference array, a plurality of measurements of a predetermined set of physical parameters wherein each measurement includes a physical parameter measurement and the location at which the physical parameter was measured;

identifying, by means of the location measurement associated with each physical parameter measurement, those measurements of physical parameters pertaining to the reference array, and those measurements of physical parameters pertaining to the crop-growing area; and employing the measured parameters for the crop-growing area and those for the reference array for evaluating the water stress status of the crops growing in the crop-growing area.

2. A method according to claim 1, wherein said step of providing a reference array includes the step of providing a compound reference surface having a predetermined plurality of component reference surfaces, in a predetermined arrangement, having predetermined radiometric properties, and including at least a first reference surface substantially equivalent to a potentially transpiring crop surface that is internally saturated;

and wherein said step of identifying includes the substep of associating each parameter measurement with one of:

the crop growing area and one of the component reference surfaces of the reference array.

3. A method according to claim 2, wherein said step of providing a compound reference surface having a predetermined plurality of component reference surfaces further includes providing at least one second substantially dry reference surface having predetermined heat-convection properties and being shielded from thermal radiation coming from therebelow.

4. A method according to claim 3, wherein said step of providing at least one second dry reference surface includes the step of providing at least two substantially dry reference surfaces, one of which is uniformly light-colored and another of which is uniformly dark-colored.

5. A method according to claim 2, wherein said step of providing a compound reference surface includes the substep of providing component reference surfaces formed of fabrics having the desired predetermined radiometric and heat-convection properties.

6. A method according to claim 2, wherein said step of providing a compound reference surface further includes the substeps of:

wetting with water the at least one first surface, said wetting occurring continuously during preselected time intervals including intervals when measurements are to be taken; and configuring the at least one first surface so as to permit substantially free evaporation therefrom.

7. A method according to claim 1, wherein said step of measuring a plurality of measurements of a predetermined set of environmental parameters includes the step of performing a plurality of measurements, in the vicinity of the crops and in the vicinity of the reference array, of at least one member of the group which consists of:

global radiation, air temperature, relative humidity, and wind speed.

8. A method according to claim 1, wherein said step of measuring a plurality of measurements of a predetermined set of physical parameters includes the step of performing a plurality of measurements of the surface temperature of the crops and of the reference array.

9. A method according to claim 8, wherein said step of measuring a plurality of measurements of the surface temperature includes the step of imaging the crop-growing area and the reference array from a predetermined altitude with a thermal imaging radiometer thereby producing a two-dimensional array of pixels corresponding to a thermal image of the crop-growing area and the reference array wherein each pixel of the thermal image provides a measurement of the surface temperature of an area of a preselected size of one of the crop-growing area and the reference array.

10. A method according to claim 9, wherein said step of imaging includes the substeps of:

producing a plurality of partial images of the crop-growing area from a predetermined altitude with a thermal imaging radiometer thereby producing a plurality of two-dimensional arrays of pixels corresponding to a plurality of thermal partial images of the crop-growing area wherein each pixel of each thermal partial image provides a measurement of the surface temperature of an area of a preselected size of the crop-growing area and wherein the plurality of thermal partial images of the crop-growing area covers the entire crop-growing area and the reference array;

locating, to a preselected precision, each of the partial images of the crop-growing area; and splicing the plurality of partial images of the crop-growing area thereby producing a two-dimensional array of pixels corresponding to a thermal image of the entire crop-growing area and of the reference array.

11. A method according to claim 10, wherein said substep of locating includes the substep of measuring a global location reference signal for each of the partial images of the crop-growing area.

12. A method according to claim 9, wherein said step of imaging the crop-growing area from a predetermined altitude is performed from an airborne platform.

13. A method according to claim 9, wherein said step of imaging is performed to produce a two-dimensional array of pixels corresponding to a thermal image of the crop-growing area and of the reference array wherein each pixel of the thermal image provides a measurement of the surface temperature of an area smaller than a meter squared.

14. A method according to claim 9, wherein said step of providing a reference array includes the step of providing a compound reference surface having a predetermined plurality of component reference surfaces each corresponding to a predetermined number of pixels in the thermal image produced thereof in said step of imaging the crop-growing area.

15. A method according to claim 9, wherein said step of providing a reference array includes the step of providing a compound reference surface having a predetermined plurality of component reference surfaces each corresponding to at least four whole pixels in the thermal image produced thereof in said step of imaging the crop-growing area.

16. A method according to claim 9, wherein said step of identifying further includes the step of distinguishing the pixels in the thermal image of the crop-growing area corresponding to locations covered with crop foliage from the pixels in the thermal image of the crop-growing area corresponding to locations not covered with crop foliage.

17. A method according to claim 16, wherein said step of employing the measured parameters includes the steps of:

performing statistical analysis of the pixel measurements for a predetermined subset of the pixels in the thermal image of the crop-growing area corresponding to areas covered with crop foliage, thereby determining an effective crop canopy temperature $T_c$;

determining, from the pixel measurements corresponding to all the component reference surfaces of the reference array and from the measurements of the environmental parameters in the vicinity of the reference array, the theoretical maximum and minimum crop canopy temperatures, $T_{max}$ and $T_{min}$, respectively;

calculating the crop water stress index (CWSI) for the crop-growing area using the formula:

$$\{CWSI\}=(T_c-T_{min})/(T_{max}-T_{min});$$

and evaluating the water stress status of the growing crops from the crop water stress index for the crop-growing area.

18. A method according to claim 17, wherein said step of determining is performed from the pixel measurements corresponding to all the component reference surfaces of the reference array and from the measurements of the global radiation in the vicinity of the reference array.

19. A method according to claim 17, wherein said step of determining is performed from the pixel measurements corresponding to the first reference surface of the reference array and from the measurements of the air temperature in the vicinity of the reference array.

20. A method according to claim 17, wherein said step of determining is performed from the synchronized temperature measurements corresponding to all the component reference surfaces of the reference array measured by the sensors associated therewith and from the measurements of the global radiation in the vicinity of the reference array.

21. A method according to claim 17, wherein said step of determining is performed from the synchronized temperature measurements corresponding to the first reference surface of the reference array measured by the sensors associated therewith and from the measurements of the air temperature in the vicinity of the reference array.

22. A method according to claim 2, wherein said step of providing a compound reference surface further includes the step of providing sensors and a clock in association with the compound reference surface for measuring predetermined physical parameters pertaining to the compound reference surface and the times at which the parameters are measured.

23. A method according to claim 2, wherein said step of measuring a plurality of measurements of a predetermined set of physical parameters further includes the steps of:

measuring a global location reference signal for the reference array;

measuring a plurality of measurements of the surface temperature for all the component reference surfaces of the reference array by means of surface temperature sensors associated with the reference array; and synchronizing, by means of the clock associated with the reference array, the measurements of the surface temperature for all the component reference surfaces of the reference array with the plurality of measurements of the surface temperature for the crops.

24. A system for evaluating the water stress status of growing crops which includes:

a reference array located at a preselected location within a predetermined proximity to a selected crop-growing area for performing reference parameter measurements thereon;

at least one sensor for measuring environmental parameters in the vicinity of the crop-growing area and of said reference array;

a portable imaging sensor for measuring a preselected physical parameter on a pixel by pixel basis over a selected area;

a portable location sensor configured to detect global location reference signals;

a mobile platform for supporting said portable imaging sensor and said portable location sensor;

data processing apparatus arranged in data receptive association with said sensors for receiving parameter measurements therefrom; and a multiplicity of communications devices for transmitting the parameter measurements from said sensors to said data processing apparatus;

wherein said reference array is configured to allow measurement of a plurality of reference parameters which, together with crop parameter measurements of growing crops, facilitates said data processing apparatus in determining the water stress status of the growing crops, and wherein said data processing apparatus includes at least one data storage device, said at least one data storage device arranged in data receptive association with said sensors for receiving parameter measurements therefrom and configurable to enable said data processing apparatus to be arranged in data receptive association therewith.

25. A system according to claim 24, wherein said portable imaging sensor is for measuring surface temperature on a pixel by pixel basis over the crop-growing area and said reference array, thereby producing a two-dimensional array of pixels corresponding to a thermal image of the crop-growing area and of said reference array.

26. A system according to claim 24, wherein said mobile platform is airborne.

27. A system according to claim 24, wherein said portable imaging sensor is configured and said mobile platform is maintained, during measurement by said portable imaging sensor, at a predetermined altitude so as to produce a thermal image of the crop-growing area and of said reference array made up of measurement pixels of a predetermined size.

28. A system according to claim 27, wherein each of said measurement pixels provides a measurement of the surface temperature of an area smaller than a meter squared.

29. A system according to claim 24, wherein said at least one sensor for measuring environmental parameters is for measuring global radiation.

30. A system according to claim 24, wherein said at least one sensor for measuring environmental parameters is for measuring air temperature.

31. A system according to claim 24, wherein said at least one sensor for measuring environmental parameters is portable and is supported by said mobile platform.

32. A system according to claim 24, wherein said reference array includes a plurality of component reference surfaces in a predetermined arrangement, each of said component reference surfaces having predetermined radiometric properties;

wherein said reference array is located at a preselected location within a predetermined proximity to a selected crop-growing area, and wherein said component reference surfaces allow measurement of a plurality of reference parameters which, together with crop parameter measurements of growing crops, facilitates determination of the water stress status of the growing crops by said data processing apparatus.

33. A system according to claim 32, wherein said component reference surfaces correspond to a predetermined number of whole pixels in said thermal image of the crop growing area and of said reference array produced by said portable imaging sensor when performing measurements at said predetermined altitude above the crop growing area and said reference array.

34. A system according to claim 33, wherein each said component reference surface corresponds to at least four whole pixels in said thermal image produced by said portable imaging sensor when performing measurements at said predetermined altitude above the crop growing area and said reference array.

35. A system according to claim 32, wherein said predetermined plurality of component reference surfaces includes at least one first reference surface fabricated to produce preselected parameter measurements substantially equivalent to those taken on a potentially transpiring crop surface that is internally saturated.

36. A system according to claim 35, wherein said first reference surface includes wetting apparatus operative to continuously wet said first reference surface with water during preselected time intervals including when measurements are to be taken and wherein said first reference surface is configured permitting substantially free evaporation therefrom.

37. A system according to claim 32, wherein said predetermined plurality of component reference surfaces further includes at least one second reference surface, said at least one second reference surface being substantially dry, being shielded from thermal radiation coming from therebelow, and being fabricated to have predetermined heat-convection properties.

38. A system according to claim 37, wherein said at least one second reference surface includes at least two substantially dry reference surfaces, including at least one uniformly light-colored surface and at least one uniformly dark-colored surface.

39. A system according to claim 32, wherein said component reference surfaces are formed of fabrics having the desired predetermined radiometric and heat-convection properties.

40. A system according to claim 32, wherein said reference array further includes at least one environmental sensor for measuring predetermined environmental parameters at the location of said reference array.

41. A system according to claim 40, wherein said predetermined environmental parameters include at least one member of the group which consists of:

global radiation, air temperature, relative humidity, and wind speed.

42. A system according to claim 40, wherein said reference array further includes:

a clock device for producing time reference signals so that the system can synchronize said reference parameter measurements with crop parameter measurements for evaluating the water stress status of the growing crops.

43. A system according to claim 32, wherein said reference array further includes temperature sensors for measuring the surface temperatures of said component reference surfaces at said reference array.

44. For use with a system for evaluating the water stress status of growing crops, a reference array for reference parameter measurements which includes a plurality of component reference surfaces in a predetermined arrangement, each of said component reference surfaces being a predetermined size and having predetermined radiometric properties;

wherein said reference array is located at a preselected location within a predetermined proximity to a selected crop-growing area, and wherein said component reference surfaces allow measurement of a plurality of reference parameters which, together with crop parameter measurements of growing crops, facilitates determination of the water stress status of the growing crops.

45. A reference array according to claim 44, wherein said predetermined plurality of component reference surfaces includes at least one first reference surface fabricated to produce preselected parameter measurements substantially equivalent to those taken on a potentially transpiring crop surface that is internally saturated.

46. A reference array according to claim 45, wherein said first reference surface includes wetting apparatus operative to continuously wet said first reference surface with water during preselected time intervals including when measurements are to be taken and wherein said first reference surface is configured permitting substantially free evaporation therefrom.

47. A reference array according to claim 44, wherein said predetermined plurality of component reference surfaces further includes at least one second reference surface, said at least one second reference surface being substantially dry, being shielded from thermal radiation coming from therebelow, and being fabricated to have predetermined heat-convection properties.

48. A reference array according to claim 47, wherein said at least one second reference surface includes at least two substantially dry reference surfaces, including at least one uniformly light-colored surface and at least one uniformly dark-colored surface.

49. A reference array according to claim 44, wherein said component reference surfaces are formed of fabrics having the desired predetermined radiometric and heat-convection properties.

50. A reference array according to claim 44, further including at least one environmental sensor for measuring predetermined environmental parameters at the location of said reference array.

51. A reference array according to claim 50, wherein said predetermined environmental parameters include at least one member of the group which consists of:

global radiation, air temperature, relative humidity, and wind speed.

52. A reference array according to claim 44, further including temperature sensors for measuring the surface temperatures of said component reference surfaces at said reference array.

53. A reference array according to claim 44, further including:

a clock device for producing time reference signals evaluating the water stress status of the growing crops and a data storage device for storing said reference parameter measurements and said time reference signals until they are transferred to the system for processing.

* * * * *